United States Patent [19]
Kokeisl

[11] 3,845,886

[45] Nov. 5, 1974

[54] DEVICE FOR METERING FLOWABLE SOLIDS FROM A CONTAINER

[76] Inventor: Theodor Kokeisl, Zurlindenstrasse 21, 5000 Aarau, Switzerland

[22] Filed: Nov. 17, 1972

[21] Appl. No.: 307,569

[52] U.S. Cl. ............................... 222/241, 222/342
[51] Int. Cl. ............................................ G01f 11/20
[58] Field of Search ........... 222/342, 236, 241, 216, 222/233, 245

[56] References Cited
UNITED STATES PATENTS

| 346,265 | 7/1886 | Charlton et al. | 222/241 |
|---|---|---|---|
| 1,452,585 | 4/1923 | Adams | 222/241 X |
| 1,673,827 | 6/1928 | Hurtt et al. | 222/342 |
| 2,435,039 | 1/1948 | Harper | 222/342 X |

FOREIGN PATENTS OR APPLICATIONS

| 49,881 | 9/1911 | Germany | 222/233 |

Primary Examiner—Richard A. Schacher
Assistant Examiner—James M. Slattery
Attorney, Agent, or Firm—Karl F. Ross; Herbert Dubno

[57] ABSTRACT

A device for metering flowable material from a container has a generally conical discharge portion terminating in a cylindrical neck and receiving an orbiting scraper which has a rearwardly upper end. The scraper is provided with a screw formation in the cylindrical portion for controlling the descent of the material to be dispensed.

2 Claims, 3 Drawing Figures

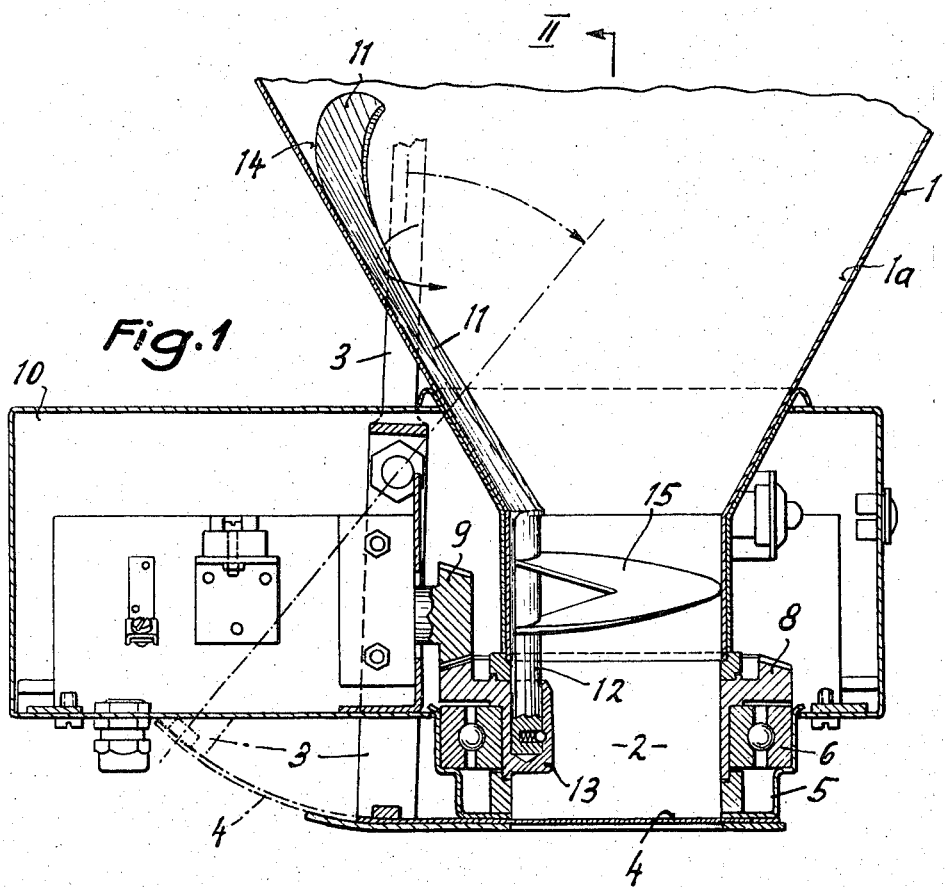
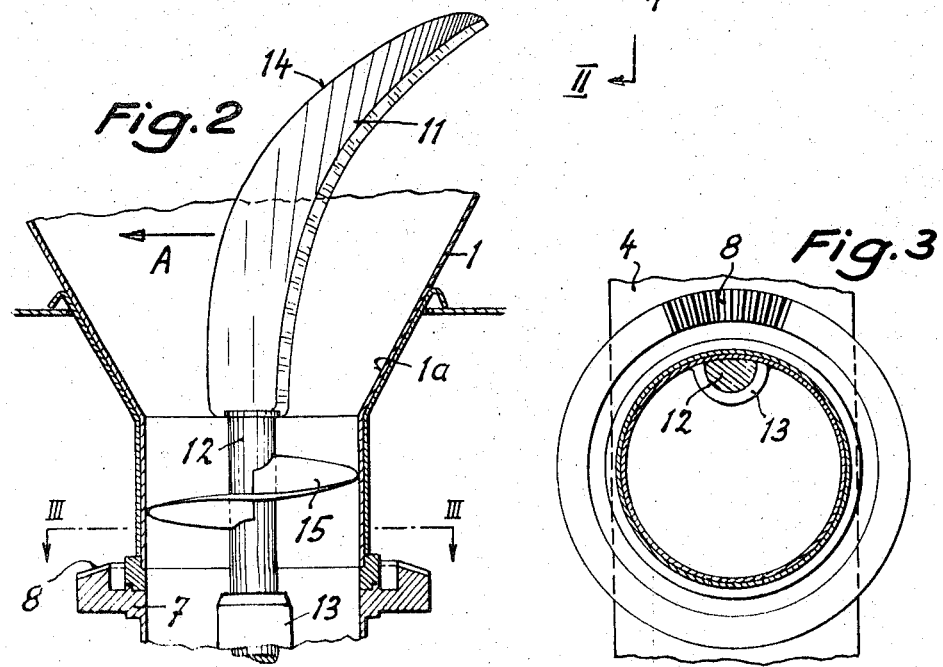

DEVICE FOR METERING FLOWABLE SOLIDS FROM A CONTAINER

This invention relates to a device on container holding loose material of a pulverulent to pasty-liquid consistency for measured discharge thereof, comprising a conical or funnel-shaped lower part, at least one agitator therein, a gate and discharge device.

The arrangement according to the invention differs from devices of the type known heretofore in that the agitator has the form of a scraper whose leading edge, led over the inside wall of the conical lower part, is curved backwards - i.e., counter to the sense of rotation of the agitator - at least in the region of its upper end.

The device of the invention has the advantage that when the scraper or the funnel wall is revolved, the scraper exerts a pressure component in opposition to the fall of the loose material, with the effect of loosening same.

In order to ensure reliable and uniform discharge of the loose material preferably, the scraper can be preferably continued with a screw conveyer acting in the direction of the downward flow of the material and arranged in the usual cylindrical extension of the conical lower part. In special cases it is also advisable to provide an additional scraper in said extension, working either alone or in combination with the screw conveyer but delivering downwards in any case. To ensure smooth discharge of the material it is convenient to employ a scraper and/or screw conveyer fixed to an annular body of rotation coaxial with the cone axis and turning about the imaginary axis of the core.

The accompanying drawing shows an embodiment of the invention; in the drawing:-

FIG. 1 is a vertical section through the arrangement;

FIG. 2 is a detail in a vertical section taken along the line II—II of FIG. 1; and FIG. 3 is a sectional view taken along the line III—III of FIG. 2.

Referring to said annexed drawing, numeral 1 designates the conical lower part 1 of a container holding and metering loose material, such as pulverulent to pasty foodstuffs like flour, sugar powder, thick soups, precooked dishes, etc. merges into a hollow cylindrical extension 2, whose opening at the bottom can be controlled anywhere between fully open and fully closed by a slide 4 operable by a lever 3. A housing 5 accommodates the annular body of rotation 7 in a ball bearing 6. This body of rotation has a toothed rim 8, its axis being coaxial with the vertical center line of the conical part 1. Toothed rim 8 is in meshing engagement with a pinion 9, driven by an electric motor accomodated in the housing part 10.

Carried in the bearing eye 13 of the body of rotation 7 is the shaft 12 of an agitator 11 designed as scraper. As may be seen best from FIG. 2, the scraper is shaped like a spatula and is curved backwards, opposite to the direction of rotation A. With its leading edge 14 sharpened the scraper 11 is led over the inside wall 1a of the conical part 1, and rests on the conical inside wall with a certain preload or pressure. For this purpose the scraper is designed for elastic flexibility, employing for example thermoplastics which remain elastic upon setting. Over its entire length the scraping edge 14 preferably lies at an angle to the cone or funnel wall, which remains substantially constant, for which purpose the scraper is twisted in the shape of a piece cut out from the conical casing 1 corresponding to the form of the scraper and following the conical surface.

In the example illustrated the scraper 11 has a screw conveyer 15 fixed on scraper shaft 12, arranged inside the upper part of extension 2 and acting in the direction of the fall of the loose material. If necessary the scraper can be lifted out of the bearing eye 13 and replaced by a scraper without a screw conveyer, or by a scraper with more or less flexure.

The extension 2 is defined by cylindrical side walls. Alternatively the extension may be conical, especially at its bottom end, either widening or narrowing towards the discharge opening. It may be practical to fit an additional scraper inside the extension, mounted on the rotating body 7 or scraper shaft 12, and also delivering downwards.

Upon rotation of the scraper 11 any material clinging to the conical inside wall 1a is dislodged. Owing to the rearward curvature of the scraper against the direction of rotation, an upward pressure component is exerted against the loose material above the scraper, loosening it somewhat in the conical lower part so as to ensure an undisturbed outflow. Smooth discharge of the loose material is assisted further by the screw conveyer 15 acting in the falling direction, and/or if necessary by an additional scraper arranged in the bottom part of extension 2 and delivering downwards.

When filling off loose material with low cohesion and low adhesion to the conical wall 1a or the inside wall of extension 2, as is the case with soups or other pasty or liquid footstuffs, it is advisable to have the conical lower part and if necessary also extension 2 fitted with at least one baffle, as fixed in relation to conical part 1 and opposed to the induced rotation of the loose material. A baffle of this kind may be in the form of a blade or rod protruding into the space swept by scraper or scrapers. Thus it is possible to have said blade or rod set at a slant or flexure with respect to the direction of fall of the loose material, so that upon revolution of the spatula or loose material there is exerted a downwardly or upwardly directed pressure component on the loose material, whereby to accelerate or retard discharge of the same.

In cases where the provision of a scraper appears advisable also in the extension below the conical lower part, this additional scraper may be in the form of a downwardly projecting continuation of the scraper working in the conical lower part.

What I claim is:

1. A device for metering flowable materials, comprising:

a container having a frustoconical downwardly converging bottom portion;

a body rotatable in said bottom portion and formed with an upwardly and outwardly extending generally straight elongated scraper lying along the inner surface of said bottom portion and formed with an edge effective to scrape material therefrom, said scraper having an upper end curved rearwardly in a direction opposite to the direction of rotation of said body; and means for rotating said body to orbit said scraper along said surface in said direction, said upper end applying force to material within said bottom portion in opposition to the gravitational pressure of the material to loosen same, said scraper having the configuration of a spatula with a sharpened leading edge in the direction of rotation and bearing elastically against said surface, said edge of said scraper being inclined to said surface at a substantially constant angle over substantially its entire length, said scraper having the configuration of a piece cut from a conical casing and extending substantially to the bottom of said frustoconical portion.

2. A device for metering flowable materials, comprising:
   a container having a frustoconical downwardly converging bottom portion;
   a body rotatable in said bottom portion and formed with an upwardly and outwardly extending generally straight elongated scraper lying along the inner surface of said bottom portion and formed with an edge effective to scrape material therefrom, said scraper having an upper end curved rearwardly in a direction opposite to the direction of rotation of said body; and
   means for rotating said body to orbit said scraper along said surface in said direction, said upper end applying force to material within said bottom portion in opposition to the gravitational pressure of the material to loosen same, said bottom portion being formed with a cylindrical neck at its lower end, said body comprising a ring rotatable about the axis of said neck, said device further comprising a screw conveyor connected to said body and disposed in said neck for controlling the discharge of material therefrom.

* * * * *